(12) United States Patent
Eriksen

(10) Patent No.: US 7,686,966 B2
(45) Date of Patent: Mar. 30, 2010

(54) AUTOMATIC TANK CLEANING SYSTEM

(75) Inventor: Frank Eriksen, Houston, TX (US)

(73) Assignee: M-I L.L.C., Houston, TX (US)

( * ) Notice: Subject to any disclaimer, the term of this patent is extended or adjusted under 35 U.S.C. 154(b) by 660 days.

(21) Appl. No.: 11/450,668

(22) Filed: Jun. 9, 2006

(65) Prior Publication Data
US 2006/0226091 A1    Oct. 12, 2006

Related U.S. Application Data

(62) Division of application No. 11/083,859, filed on Mar. 18, 2005, now Pat. No. 7,232,525.

(60) Provisional application No. 60/554,557, filed on Mar. 19, 2004, provisional application No. 60/565,303, filed on Apr. 26, 2004, provisional application No. 60/620,377, filed on Oct. 20, 2004, provisional application No. 60/633,766, filed on Dec. 7, 2004.

(51) Int. Cl.
*C02F 1/00* (2006.01)
*B01D 21/24* (2006.01)

(52) U.S. Cl. ............... 210/803; 210/804; 210/805; 210/195.1; 210/196; 210/258; 210/259; 210/294; 210/521; 210/522; 210/534

(58) Field of Classification Search .......... 210/258, 210/259, 294, 521, 522, 534, 803, 804, 805, 210/195.1, 196
See application file for complete search history.

(56) References Cited

U.S. PATENT DOCUMENTS 3,965,013 A * 6/1976 Jackson ............. 210/534

| | | |
|---|---|---|
| 4,466,154 A | 8/1984 | Urbani |
| 4,771,503 A | 9/1988 | Urbani |
| 5,422,019 A | 6/1995 | Carman |
| 5,908,040 A | 6/1999 | Defraites, Jr. |
| 6,615,849 B1 | 9/2003 | Gilman et al. |
| 2003/0209257 A1 | 11/2003 | Hebert |

OTHER PUBLICATIONS

International Preliminary Examination Report issued in International Application No. PCT/US05/009437; dated Oct. 26, 2006; 7 pages.

* cited by examiner

*Primary Examiner*—David A Reifsnyder

(57) ABSTRACT

An automatic tank cleaning system includes a water recycling unit having a weir therein and a conically-shaped bottom, a cutting box having a portable weir therein, a hydrocyclonic separator, and a mud tank. Tank slop is pumped from the mud tank to the water recycling unit where solids collect at the bottom. The solids are removed and collected in the cutting box. Water in the recycling unit may be pumped through the hydrocyclonic separator. Solids removed by the separator are collected in the cutting box and the water is directed into a clean water compartment defined by the weir within the recycling unit. Water in the cutting box is collected by the portable weir therein and pumped to the clean water compartment. Water from the clean water compartment is pumped to one or more rotary jet heads within the mud tank. Overflow from the water recycling unit may be directed to the cutting box. A chemical inductor may be used to add cleaning chemicals to the water prior to being directed through the wash nozzle. Turbulence preventers may be included at the inlet of each flow line to prevent turbulence from occurring in the tank to which the fluid is directed.

16 Claims, 5 Drawing Sheets

AUTOMATIC TANK CLEANING SYSTEM

This application is a divisional application of U.S. patent application Ser. No. 11/083,859 filed on Mar. 18, 2005 now U.S. Pat. No. 7,232,525 B2, which claims the benefit of U.S. Provisional Application No. 60/554,557, filed Mar. 19, 2004 and entitled, "Automatic Tank Washing Apparatus and Method of Use", U.S. Provisional Application No. 60/565,303, filed Apr. 26, 2004 and entitled, "Automatic Tank Washing Apparatus and Method of Use", U.S. Provisional Application No. 60/620,377, filed Oct. 20, 2004 and entitled, "Automatic Tank Cleaning System", and U.S. Provisional Application No. 60/633,766, filed Dec. 7, 2004 and entitled, "Automatic Tank Cleaning System," the contents each of which are incorporated herein by reference.

BACKGROUND OF INVENTION

Rotary drilling methods employing a drill bit and drill stems have long been used to drill wellbores in subterranean formations. Drilling fluids or muds are commonly circulated in the well during such drilling to cool and lubricate the drilling apparatus, lift cuttings out of the wellbore, and counterbalance the subterranean formation pressure encountered. Drilling fluids and muds often contain entrained solids which have been purposefully added, such as: weighting agents, such as barite, hematite, aluminite, and the like; viscosifying agents including sepolite clay, and other viscosifying clays; and fluid loose control agents, etc. . . . as well as very fine solid particles generated by the drilling process. Unlike drill cuttings, these entrained solids are difficult to remove by screening. However, upon standing, the solids often settle out over long periods of time (i.e. hours to days). Thus when the used drilling fluids or muds are being stored in tanks awaiting transport for recycling, these entrained solids typically settle out into the bottom of the tank and form a dense layer of solids.

Removal of the settled entrained solids from the bottom of a tank has proven to be a difficult problem. The current state of the art is to have a crew of at least two men enter the drained tank and using high pressure washing equipment and vacuums, wash and remove via vacuum the dense layer of solids. Such operations are both time and labor intensive and involve placing people inside of large storage tanks which raises certain safety concerns. One alternative has been to use tanks with a steep conical sidewall shape which helps prevent the settling of the solids. However, such tanks are expensive and an inefficient use of space on an offshore drilling rig or drilling rig service boat.

Thus there exists an ongoing need for improvements in the apparatus and methods used to clean tanks of sediments and solids deposited in them.

SUMMARY

The present disclosure is generally directed to an apparatus and method for washing/cleaning the inside of a tank in which fluid having entrained solids have been stored. One illustrative embodiment of the present invention is a portable or permanently installed tank washing system which recovers water from slop (dirty cleaning water) by separating water, oil, and solids. The slop is directed to a water recycling unit. The solids collected in the water recycling unit are sent to a cuttings box that is temporarily modified to serve as a weir tank. In the cuttings box weir tank, water is recovered and pumped back to the water recycling unit. An overflow line from the water recycling unit is also connected to the same cutting box to prevent overfilling the tank. The same overflow line sends separated oil to the cuttings box. Water that passes under the weir in the water recycling unit is directed to one or more hydrocyclones. The purge flow from the hydrocyclone is sent to the cuttings box weir tank. The overflow from the hydrocyclone is sent to the clean water compartment of the water recycling unit. Water recovered by the water recycling unit is pumped to the tank cleaning machines via a chemical inductor where cleaning chemicals may be added. Tank cleaning machines are rotary jet heads that clean the internal surfaces of the tank.

One of skill in the art will notice that the illustrated system can be portable; it recycles the water by separating solids (barite) using hydrocyclones in line with a weir tank that also serves as a buffer tank. It uses a hydraulic portable submersible pump and a any kind of cuttings box serving as a temporary weir tank to bring back the water to the process.

Other aspects and advantages of the claimed subject matter will be apparent from the following description and the appended claims.

DETAILED DESCRIPTION

Figure 1:
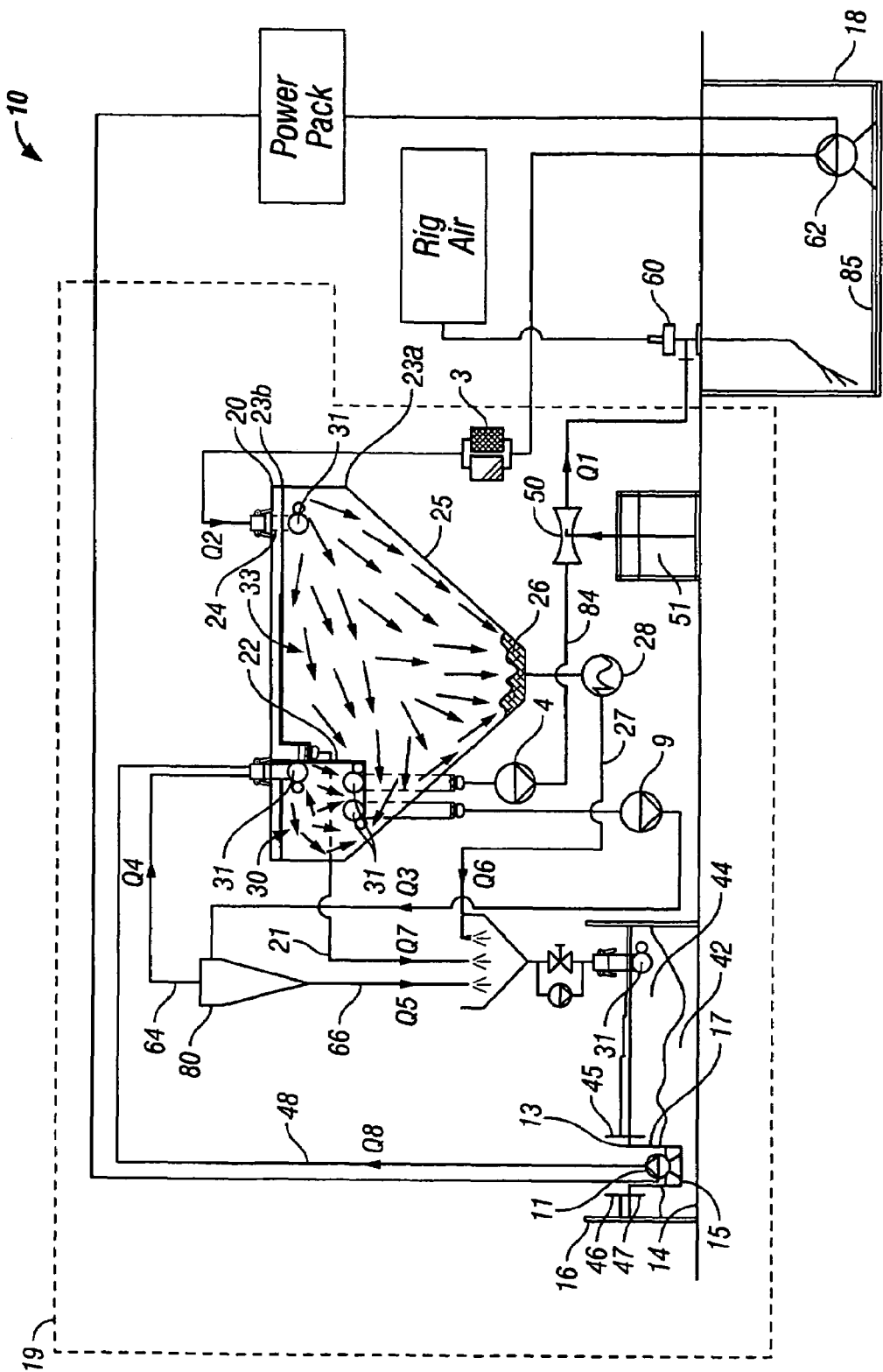
FIG. 1 is a schematic view of the automatic tank cleaning system.

The above illustrative embodiment will be better understood with reference to FIG. 1 in which the tank cleaning system 10 is schematically shown. One of skill in the art should appreciate that the schematic utilizes generally accepted representations of pumps, etc., which should be well known.

Turning now to FIG. 1, the tank cleaning system 10 includes a water recycling unit 19 and one or more rotary jet head washers 60. Discussion of the components of this closed system will begin with the rotary jet head washers 60.

Figure 3:
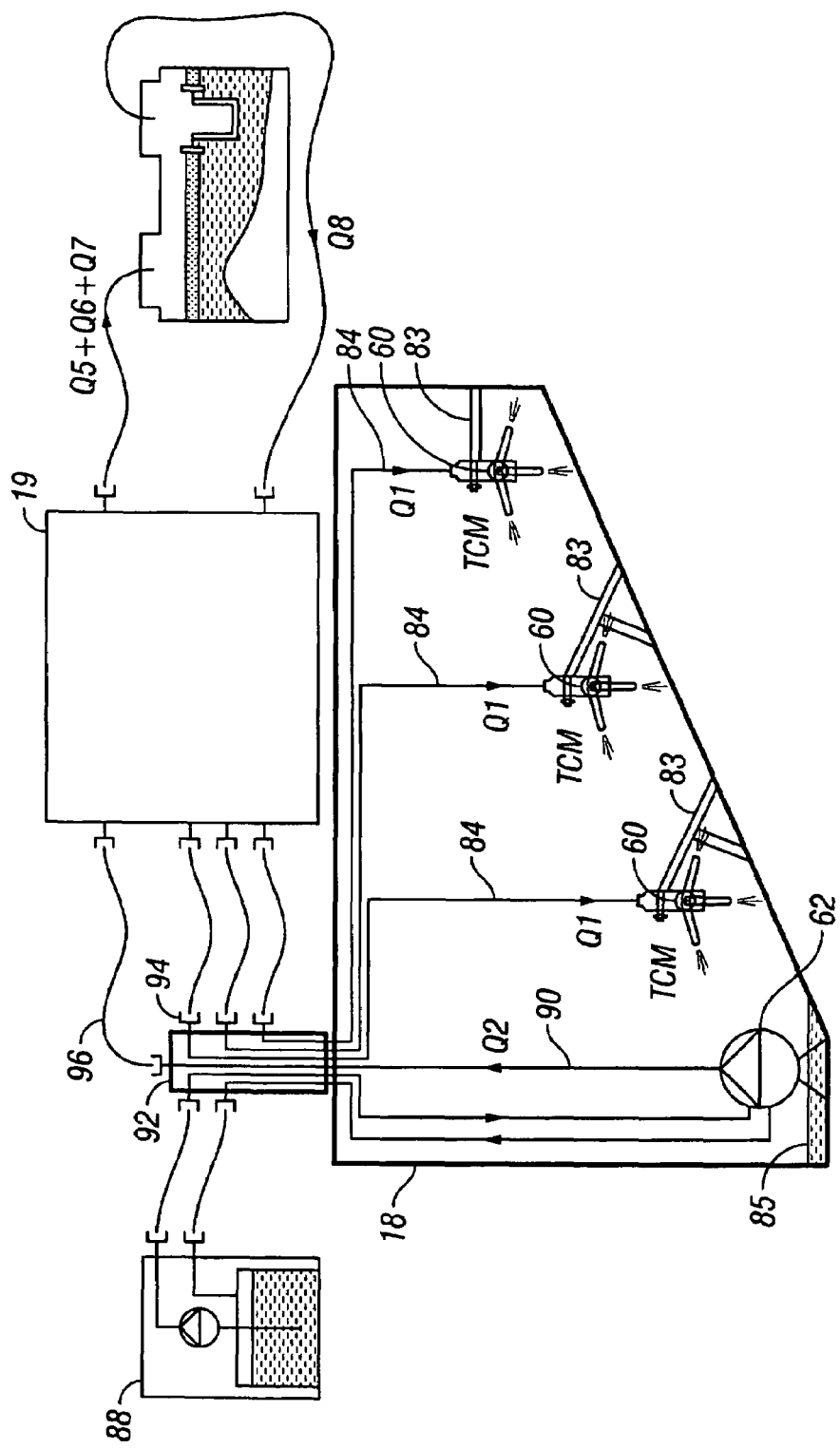
FIG. 3 is a schematic view of the skidded components of the automatic tank cleaning system.

Referring to FIG. 3, one or more of the rotary jet head washers 60 are positioned within the mud tank 18. Although shown as being fixed in position, these multi-headed or single-headed nozzle rotary jet heads 60 may be lowered into the tank 18 or otherwise suspended and positioned temporarily or permanently within the tank 18 using brackets 83, stands, penetration through the deck/side of the tank or the like. The rotary jet heads 60 are supplied with pressurized wash fluid by way of the wash fluid lines 84. The rotation of the nozzles might be provided by a pneumatic motor or by a turbine in the cleaning fluid flow. As the wash fluid exits the rotary jet heads 60, the tank 18 is washed with pressurized wash fluid which dislodges any solids or sediments present in the tank 18, thus generating tank slop 85 which is a combination of solids and wash fluid. A hydraulic pump 62 connected to a hydraulic power unit 88 is used to take up the tank slop 85 and pump the combination of solids and wash fluid up the tank slop line 90. As shown, the hydraulic pump 62 is lowered into the tank 18 for use in the washing operation, but alternatively the pump 62 may be mounted either temporarily on brackets or permanently mounted in the tank 18. The tank slop line 90 carries the tank slop 85 directly to the water recycling unit 19 or through a modular fluid distribution manifold 92 which is designed with control valves (not shown) and hose connections 94, or preferably quick connect hose lines. The tank slop 85 is then pumped by way of the external slop line 96 to the water recycling unit 19.

Referring to FIG. 1, the water recycling unit 19 includes a water recycling tank 20, a cuttings box 16, and a hydrocyclone 80. The water recycling tank 20 is a type of weir tank having a weir 22 extending from a top cover (shown but not numbered) into the water recycling unit to separate a dirty water compartment 33 from a clean water compartment 30. The tank slop 85 is pumped into the top portion of the water recycling tank 20 at an inlet 24 located near the top edge distal the weir 22. A turbulence preventer 31 preferably is included near all water and slop inlets and outlets to prevent turbulence in the water recycling unit 19. Such a turbulence preventer 31 may be of any structure sufficient to dissipate the force associated with a well-defined fluid streams, including a shield, a forked nozzle to disperse the stream into multiple streams, or other type of diffuser. The water recycling tank 20 has a sloped bottom 25, which might be round, squared or rectangular. The solids 26 from the tank slop 85 fall to the bottom of the water recycling tank 20 and are gathered in the sloped bottom 25. The solids that collect at the sloped bottom 25 of the water recycling tank 20 are pumped by an auger fed progressive cavity pump 28 to the cutting box 16 through a line 27 at a volumetric flow rate Q6. Alternatively, the solids may be released from the water recycling tank 20 by a valve and pumped to the cuttings box 16.

The liquid in the water recycling tank 20 that is just about to enter the clean water compartment 30 from the dirty water compartment 33 may be pumped to one or more hydrocyclones 80. Small solids that did not settle out of the fluid when introduced in the water recycling tank 20 are removed by the centrifugal force created within the hydrocyclone 80. Solids are directed by purge flow line 66 from the hydrocyclone 80 to the cuttings box 16 with a volumetric flow rate Q5. The solids may be gravity fed or pumped from the hydrocyclone 80. The overflow from the hydrocyclone 80 is directed through line 64 to the clean water compartment 30 with a volumetric flow rate Q4. A turbulence preventer 31, located at the inlet of the clean water compartment 30 prevents turbulence and may be a shield, a forked nozzle to disperse the stream into multiple streams, or other type of diffuser. As will be shown, the substantially solids-lean wash fluid generated by the separation units is recycled to serve as the wash fluid.

An overflow line 21 from the water recycling unit 20 directs fluid from the top portion of the water recycling tank 20 to the cuttings box 16 with a volumetric flow rate Q7. The fluid through overflow line 21 may be pumped or gravity fed to the cuttings box 16. The overflow line 21 prevents spills caused by overfilling the water recycling tank 20 and directs separated oil to the cuttings box 16.

The cutting box 16 used to promote the settling of the solids 42 from the solid slurry may be any cutting box normally found onboard drilling rigs. To promote such settling of solids, a temporary and portable weir bucket 15 may be utilized. The weir bucket 15 is suspended within the cuttings box 16 above the cuttings box floor 14. As the level of solids 42 in the cuttings box 16 rises, the weir bucket 15 may be raised so that solids do not drop over the weir bucket wall 17 into the weir bucket 15. The substantially solids-lean fluid 44 in the cuttings box 16 is allowed to overflow into the weir bucket 15. An oil trap 45 surrounds an upper portion of the weir bucket 15. The oil trap 45 is spaced apart from the weir bucket 15 and preferably is substantially parallel with the weir bucket wall 17. The oil trap 45 has a top edge 46 located above the top edge 13 of the weir bucket 15, and a bottom edge 47 located below the top edge 13 of the weir bucket 15. Once the level of fluid 44 within the cuttings box 16 rises to the level of the bottom edge 47 of the oil trap 45, any oil floating atop the fluid 44 is prevented from flowing into the weir bucket 15 by the oil trap 45. Water will pass under the oil trap 45, and to the space between the oil trap 45 and the weir bucket 15 before overflowing into the weir bucket 15. From within the weir bucket 15, the substantially solids-lean fluid is pumped through fluid line 48 to the clean water compartment 30 of the water recycling tank 20 with a volumetric flow rate Q8.

As previously discussed, the cuttings box 16 may be any cuttings box as used onboard a rig and as typically used to transport drill cuttings. Once a first cuttings box 16 is nearly full with solids 42, the weir bucket 15 is removed and positioned within a second, empty cuttings box 16. The second cuttings box 16 then replaces the first cuttings box 16. Valves may be used to temporarily stop or divert the flow to the first cuttings box 16 while it is replaced with the second cuttings box 16.

The flow from each flow line 21, 27, 66, may be commingled in a hopper and directed into the cuttings box 16 in a controlled stream. A turbulence preventer 31 may be included to minimize agitation to the solids 42 collected in the cuttings box 16 and prevent remixing of the solids 42 and the fluid 44. The turbulence preventer 31 may include diffusing nozzles or forked flow directors at each outlet to reduce the force associated with any one flow while maintaining the overall flow rate into the cuttings box 16.

The flow of fluid into the clean water compartment 30 comes from the weir bucket 15 at a flow rate Q8 and from the hydrocyclone overflow line 64 at a flow rate Q4. The total volumetric flow rate into the clean water compartment 30 is thus Q8+Q4. The flow rate of the fluid out of the clean water compartment 30 to the mud tank 18 is Q1. In the water recycling tank 20, the total flow rate into the clean water compartment, Q8+Q4 typically will be greater than the flow rate Q1 to the mud tank 18 resulting in positive pressure inside the clean water compartment 30. That is, the pressure inside the clean water compartment 30 will be greater than the pressure within the remainder of the water recycling tank 20. Thus, the water within the clean water compartment 30 is not contaminated with dirty fluid from within the dirty water compartment 33 of the water recycling tank 20 as long as the hydrocyclone 80 is in use.

The use of hydrocyclones 80 to remove fine solids from the water is not necessary for the operation of the automatic tank cleaning system 10, however efficiency of the system 10 is reduced when no further separation operations are included.

Figure 2:
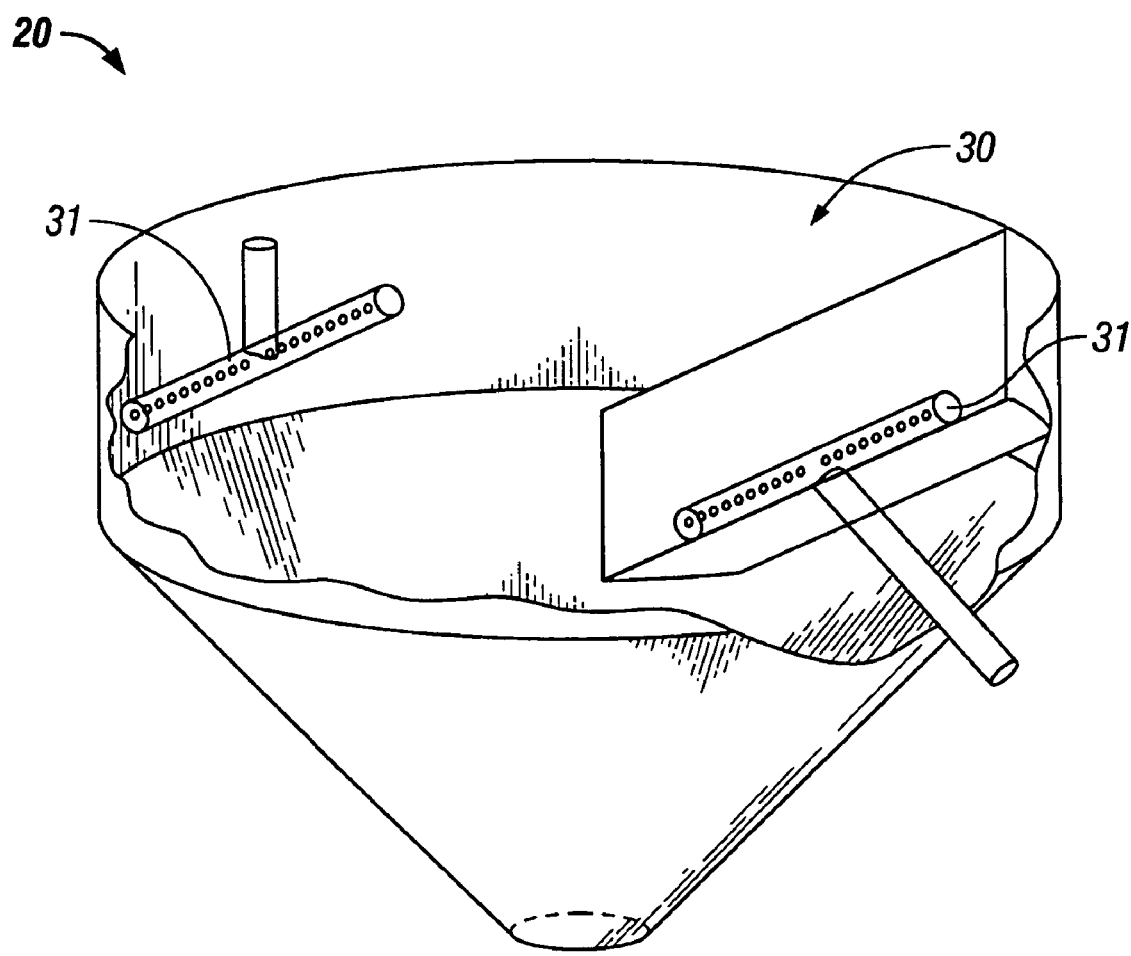
FIG. 2 is a cutaway perspective view of the water recycling unit tank.

Referring to FIGS. 1 and 2, the water recycling tank 20 includes turbulence preventers 31 at the inlet to the clean water compartment 30 from flow lines 48, 64 where the combined volumetric flow rate is Q4+Q8, the outlet to the flow line to the hydrocyclone 80 where the volumetric flow rate is Q3, the outlet to flow line 84 to the mud tank nozzles 60 where the flow rate is Q1, and the inlet to the water recycling tank 20 from the mud tank 18 where the flow rate is Q2. In addition, turbulence preventers are included where the hydrocyclone over flow line 64, the overflow line 21 from the water recycling tank 20, and the solids discharge line 27 enter the cuttings box 16 with flow rates of Q5, Q7, and Q6, respectively. Turbulence inside the water recycling tank 20 and the cuttings box 16, or forces that cause the water to spin inside the tank or cuttings box, reduces the efficiency of the automatic cleaning system 10. Therefore, it is important to prevent such turbulence. The turbulence preventer 31 breaks the stream from the individual flow lines.

The clean water from the clean water compartment 30 is pumped through flow line 84 with a volumetric flow rate of Q1, to one or more rotary jet heads 60 that clean the tank 18. Upon consideration of the above illustrative apparatus, one of skill in the art should understand and comprehend the method by which a tank can be quickly and easily cleaned of sediment or other solids that may be present. It also should be appreciated that a wide variety of wash fluids will be able to used with the present illustrated embodiment. Such fluids may include detergents, surfactants, antifoaming agents, suspending agents, lubricating agents (to reduce the wear caused by the flowing solids), and the like to assist in the quick and efficient cleaning of the tank. A chemical inductor 50 may be used to add such cleaning chemicals 51 to the wash water.

The water recycling tank 20 also acts as a buffer tank. The transfer of clean water from the clean water compartment 30 to the mud tank 18 and the return of slop, or dirty water, from the mud tank 18 to the water recycling tank 20 is not instantaneous. In addition to the time required for the fluid to cycle from the mud tank 18 to the water recycling tank 20, solids in the mud tank 18 can trap water and further delay the return of slop to the water recycling unit tank 20. The buffer capacity compensates for this delay of return.

The water recycling tank 20 has a minimum operational level 23a and a maximum operational level 23b. The minimum operational level 23a is located slightly above the outlet to flow line 84 to the mud tank 18. When the fluid level within the water recycling tank 20 drops below the minimum operational level 23a, the flow through flow line 84 will stop. When the fluid level within the water recycling tank 20 raises above the maximum operational level 23b, the fluid will flow into overflow line 21 to the cuttings box 16. The overflow line 21 will direct oil that has separated from the water in the dirty water compartment to the cuttings box 16.

Upon reflection, one of skill in the art will appreciate that with a system as described herein, a wide variety of tanks, specifically mud tanks can be cleaned automatically, faster, safer and with less people than using manual labor. Further it will be appreciated that the disclosed system will reduce or eliminate confined space entry, which is required under the current state of the art practices. In addition it will be appreciated by such a skilled artisan that the disclosed systems and methods will reduce the quantity of waste generated in the cleaning process as compared to other state of the art apparatus and methods.

Figure 4:
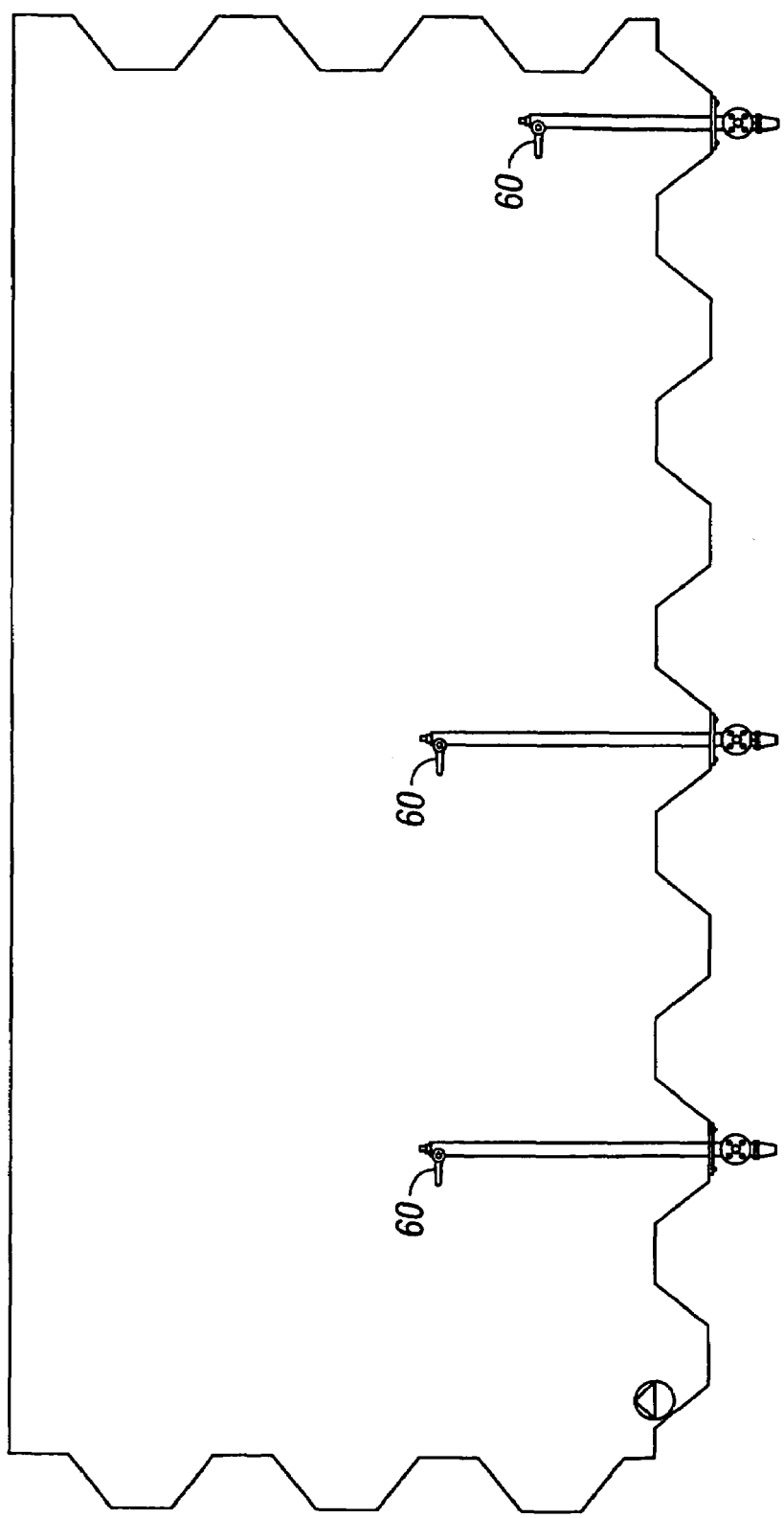
FIG. 4 is a schematic view of one embodiment of a washer nozzle head placement.
Figure 5:
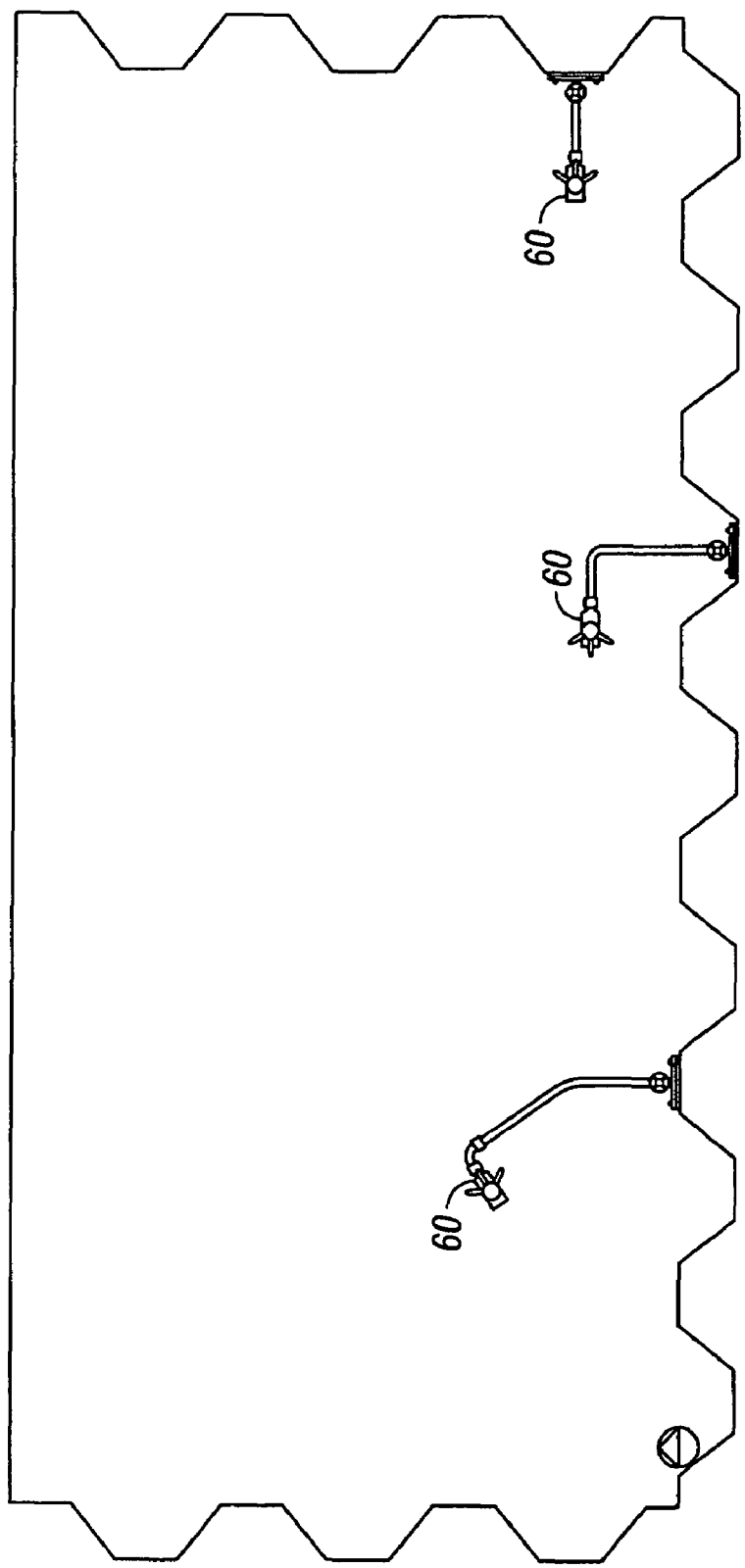
FIG. 5 is a schematic view of one embodiment of a washer nozzle head placement.

With reference to FIG. 4 and FIG. 5 the strategic positioning of the washers within the tank can be an important to maximize the cleaning action of the rotary jet heads. The list of factors taken into account in the placement of the rotary jet heads include: the design and nature of the effective cleaning area and pattern of the rotary jet heads; the position of the rotary jet head relative to the tank's surfaces to be cleaned; the presence or absence of bulkheads or other supporting structures; the presence of any "shadow" areas within the tank that may prove difficult to clean; the extent of wash overlap (i.e. areas of the tank that are washed by more than one of the rotary jet heads) desired; the areas of the tank where maximum cleaning is desired; the desirable pattern of washing towards the pump and other factors which will be apparent to one of skill in the art. It should be appreciated that each tank will have an optimum location pattern for the washer nozzles. This optimum pattern may be determined by taking into account the above noted factors, or alternatively by simple trial and error methods of temporarily locating the washers and running tests to optimize the washing effect.

With reference to FIG. 4 and FIG. 5 it should be noted that in some instances the rotary jet heads will be mounted on brackets and extension pipes above the surface of the tank to achieve the optimized washing effect. The use of tubing and brackets of various angles will necessarily depend upon the tank configuration as will be appreciated by one of skill in the art. As shown in FIG. 4 and FIG. 5. a change in the types of nozzles used (i.e. the nozzles spray pattern in one figure are "programmable" and in the second they are fixed) causes a change in the configuration of and placement of the nozzles. With the benefit of the present disclosure, one of skill in the art should be able to maximize the washing efficiency of the nozzles within a specific tank without undue experimentation.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. An apparatus for continuously recycling water used in a tank cleaning process, the apparatus comprising:
    a dirty water compartment into which an inlet directs slop water containing solids;
    wherein solids in the slop water can settle within the dirty water compartment and be released through a solids outlet, thereby resulting in separated water;
    a clean water compartment;
    a weir separating the dirty water compartment from the clean water compartment;
    wherein the weir lets the separated water be communicated from the dirty water compartment to the clean water compartment when a predetermined volume of slop water is communicated to the dirty water compartment;
    an outlet for communicating the separated water from the dirty water compartment to an external location to have additional solids removed from the separated water just before the separated water enters the clean water compartment;
    a clean water inlet communicating the separated water from which additional solids have been removed from the external location to the clean water compartment; and
    a clean water outlet communicating clean water from the clean water compartment.

2. The apparatus of claim 1, further comprising:
    an overflow line at a predetermined position within the dirty water compartment removing floating fluids and solids when a volume of slop and dirty water greater than a predetermined volume is present within the dirty water compartment.

3. The apparatus of claim 2 wherein the clean water inlet receives cleaned water from a plurality of sources.

4. The apparatus of claim 1, further comprising:
    a turbulence preventer at the inlet through which slop water containing solids is directed into the dirty water compartment; and
    a turbulence preventer at the clean water inlet.

5. The apparatus of claim 4, wherein the turbulence preventers are shields.

6. The apparatus of claim 4, wherein the turbulence preventers are forked nozzles.

7. The apparatus of claim 1, wherein the solids outlet comprises:

an auger-fed progressive cavity pump operable to feed solids collected at the bottom of the dirty water compartment to an adjacent location.

8. The apparatus of claim 1, wherein the solids outlet comprises:
a valve operable to selectively drain solids collected at the bottom of the dirty water compartment.

9. A method of recycling water used in a tank cleaning process comprising:
receiving slop water containing solid particles in a dirty water compartment of a tank apparatus;
holding the slop water in the dirty water compartment long enough for the solid particles to settle to a bottom portion of the tank apparatus, thereby leaving separated water from which the solid particles have separated;
removing the settled solids from the bottom portion of the tank apparatus;
continuing to fill the dirty water compartment with slop water until the separated water reaches a clean water compartment of the tank apparatus defined by a weir;
directing the separated water from a point near the weir between the dirty water compartment and the clean water compartment to have additional solids separated therefrom, thereby leaving cleaned water;
receiving the cleaned water into the clean water compartment of the tank apparatus; and
directing the cleaned water from the clean water compartment to an external tank to be cleaned.

10. The method of claim 9, further comprising:
removing floating fluids and solids through an overflow line at a predetermined position within the dirty water compartment when a volume of slop and separated water greater than a predetermined volume is present within the dirty water compartment.

11. The method of claim 10, further comprising:
directing the solids settling in the dirty water compartment to a solids outlet in the bottom portion of the dirty water compartment.

12. An apparatus for recycling fluid used in a tank cleaning process, wherein the tank cleaning process includes providing water to a dirty tank to be cleaned, the apparatus comprising:
a dirty water compartment within which solids are separated from slop water to result in separated water;
a clean water compartment in fluid communication with the dirty water compartment and located above at least a portion of the dirty water compartment;
a weir separating the dirty water compartment and the clean water compartment;
a slop inlet communicating slop water from the dirty tank to the dirty water compartment;
a solids outlet communicating settled solids from the slop water out of the dirty water compartment;
an outlet communicating the separated water from the dirty water compartment to an external location for additional solids to be removed from the separated water, thereby resulting in cleaned water;
a clean water inlet communicating cleaned water into the clean water compartment; and
a clean water outlet communicating cleaned water out of the clean water compartment.

13. The apparatus of claim 12, further comprising:
an overflow line communicating floating fluids and solids from the dirty water compartment when a volume of slop and settled water within the dirty water compartment exceeds a maximum operational level; and
wherein the clean water inlet communicates fluid from a plurality of external sources to the clean water compartment.

14. The apparatus of claim 12, further comprising:
a turbulence preventer on the slop inlet; and
a turbulence preventer on the clean water inlet.

15. The apparatus of claim 12, wherein the dirty water compartment has a bottom portion with sloped sides directing settled solids to the solids outlet.

16. The apparatus of claim 15, wherein the solids outlet comprises an auger-fed progressive cavity pump selectively removing the settled solids from the dirty water compartment.

* * * * *